(12) United States Patent
Webber et al.

(10) Patent No.: US 6,409,213 B2
(45) Date of Patent: Jun. 25, 2002

(54) ADAPTIVE INFLATION MECHANISM

(75) Inventors: James Lloyd Webber, Shelby Township, Macomb County, MI (US); Robert Lee Jones, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/866,366

(22) Filed: May 25, 2001

Related U.S. Application Data (62) Division of application No. 09/473,436, filed on Dec. 28, 1999.

(51) Int. Cl.⁷ .............................................. B60R 21/30
(52) U.S. Cl. ...................... 280/739; 280/738; 280/741
(58) Field of Search ................................ 280/739, 741, 280/743.2, 730.1, 738

(56) References Cited

U.S. PATENT DOCUMENTS

| | | | |
|---|---|---|---|
| 5,364,125 A | * 11/1994 | Brown et al. | 280/730 A |
| 5,489,119 A | 2/1996 | Prescaro et al. | 280/743.2 |
| 5,492,363 A | * 2/1996 | Hartmeyer et al. | 280/739 |
| 5,501,488 A | 3/1996 | Saderholm et al. | 280/739 |
| 5,762,367 A | 6/1998 | Wolanin | 280/736 |
| 5,799,974 A | 9/1998 | Honda | 280/739 |
| 6,017,056 A | 1/2000 | Lee | 280/739 |
| 6,123,358 A | * 10/2000 | Ryan et al. | 280/739 |
| 6,131,942 A | 10/2000 | Fujii et al. | 280/728.2 |
| 6,142,517 A | * 11/2000 | Nakamura et al. | 280/739 |
| 6,161,866 A | 12/2000 | Ryan et al. | 280/736 |
| 6,254,130 B1 | * 7/2001 | Jayaraman et al. | 280/743.2 |

FOREIGN PATENT DOCUMENTS

| | | | |
|---|---|---|---|
| DE | 19703945 | 8/1998 | B60R/21/26 |
| DE | 19912369 | 10/2000 | B60R/21/26 |
| GB | 2338214 | 12/1999 | B60R/21/26 |

* cited by examiner

*Primary Examiner*—Kenneth R. Rice
*Assistant Examiner*—Christopher Buchanan
(74) *Attorney, Agent, or Firm*—Kathryn A. Marra

(57) ABSTRACT

This present invention provides variable deployment performance by controlling the quantity and fluid flow path of the inflator gas into or out of an air bag module according to the present invention. The air bag module includes a slide ring mechanism disposed about an inflator and adjacent at least a portion of a cushion retainer. The slide ring mechanism comprises an annular ring having openings formed therein, wherein during rotation of the slide mechanism, the openings of the annular ring align with openings formed in the cushion retainer to define a fluid flow path away from an air bag cushion for venting some of the inflator gas. Preferably, the annular ring is rotated by attaching a pair of tethers to the annular ring and to a rear surface of the air bag cushion. As the air bag cushion inflates and reaches a predetermined pressure, the tethers are pulled causing the slide ring to rotate so that the openings in the annular ring and cushion retainer align directing an amount of inflator gas away from the air bag cushion. The present invention thus provides a direct mechanical system for cushion pressure feedback to tailor the inflation.

13 Claims, 5 Drawing Sheets

ADAPTIVE INFLATION MECHANISM

This application is a divisional of Ser. No. 09/473,436, filed Dec. 28, 1999.

TECHNICAL FIELD

The present invention relates generally to vehicle supplemental inflatable restraint systems and, more particularly, to an air bag module that provides variable output inflation of an air bag cushion from a single inflator.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas created flows through an outlet to the cushion. A third type is the hybrid or augmented type. This type includes a pressure vessel containing stored pressurized gas and a gas generator. When the generator is ignited, the resultant gas flows with and heats the stored gas going to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. Devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation. It is also known in the art to use a system having two discrete inflators to accomplish dual level inflation. In these types of systems, two discrete inflators are deployed at the same time or at a delayed time depending upon the severity of the sudden deceleration.

SUMMARY OF THE INVENTION

This invention offers advantages and alternatives over the prior art by providing an air bag module which offers variable output inflation of an air bag cushion. The air bag module includes an inflator, a cushion retainer, a slide mechanism, and a base plate for supporting the inflator, the slide mechanism, and the cushion retainer. The cushion retainer includes inner and outer annular walls, wherein the slide mechanism is disposed between the inner and outer annular walls. The cushion retainer includes at least one and preferably a plurality of diffuser openings and the slide mechanism comprises a rotatable ring having openings formed in an annular wall thereof. The slide mechanism has connecting tabs at an upper edge thereof and each connecting tab is connected to a first end of a tether. The second end of the tether is secured to a rear surface of an air bag cushion. The air bag cushion is disposed about the inflator, cushion retainer and base plate, wherein the air bag cushion is retained to the cushion retainer.

Under deployment conditions, a controller actuates the inflator to cause generation of heated inflator gas. The heated inflator gas is discharged through vent ports formed in the inflator and flows initially according to a first fluid flow path in which the heated inflator gas flows into the air bag cushion. As the air bag cushion begins to inflate the rear surface thereof becomes under stress and the second end of each tether attached to the air bag cushion tightens. Because the first end of the tether is attached to the connecting tab of the slide ring, the slide ring is rotated about the cushion retainer as a result of the tightening of the tether. As the slide ring rotates, the openings formed within the slide ring axially align with the openings formed in the cushion retainer. The alignment of the openings effectively opens a second fluid flow path, wherein the heated inflator gas flows through the openings of the cushion retainer and the slide ring and exits the air bag module through an opening formed in the base plate. Thus, some of the heated inflator gas is directed away from the air bag cushion resulting in reduced inflation thereof.

The use of the slide mechanism and attached tethers provides a direct mechanical system for cushion pressure feedback to tailor the inflation. More specifically, the use of tethers in combination with the slide ring permits the pressure of the air bag cushion to be sensed, due to the unfolding action of the air bag cushion, and when the cushion pressure reaches a predetermined level, some of the heated inflator gas is vented off and is directed out the air bag module away from the air bag cushion.

The slide mechanism of the present invention permits the proper variable inflation of the air bag cushion when the occupant is in either a forward position in a seat, a more rearward position in the seat, or positions therebetween. When the occupant is positioned closer to the SIR system, the inflating air bag cushion contacts the occupant earlier in the inflation process than if the occupant was seated more rearwardly in the seat. As the air bag cushion contacts the occupant and continues to inflate, the rear surface of the air bag cushion will become stressed earlier in time than if the occupant was seated more rearwardly. Accordingly, the tether is tightened earlier resulting in the rotation of the slide ring to thereby open the second fluid flow path. This results in some of the inflator gas being directed away from the air bag cushion and therefore a lower level of deployment is achieved. In other words, when the occupant is positioned closer to the SIR system, the actuation of the slide ring occurs sooner in time than if the occupant is seated more rearwardly. When the occupant is seated more rearwardly, the air bag cushion inflates to a greater volume before contacting the occupant. Thus a higher level of deployment is achieved before the air bag cushion becomes stressed and the slide ring is actuated to direct some of the inflator gas away from the air bag cushion. Advantageously, the slide mechanism provides variable inflation and the slide mechanism is designed to actuate depending upon the positioning of the occupant so as to inflate the air bag cushion to a desired predetermined level.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
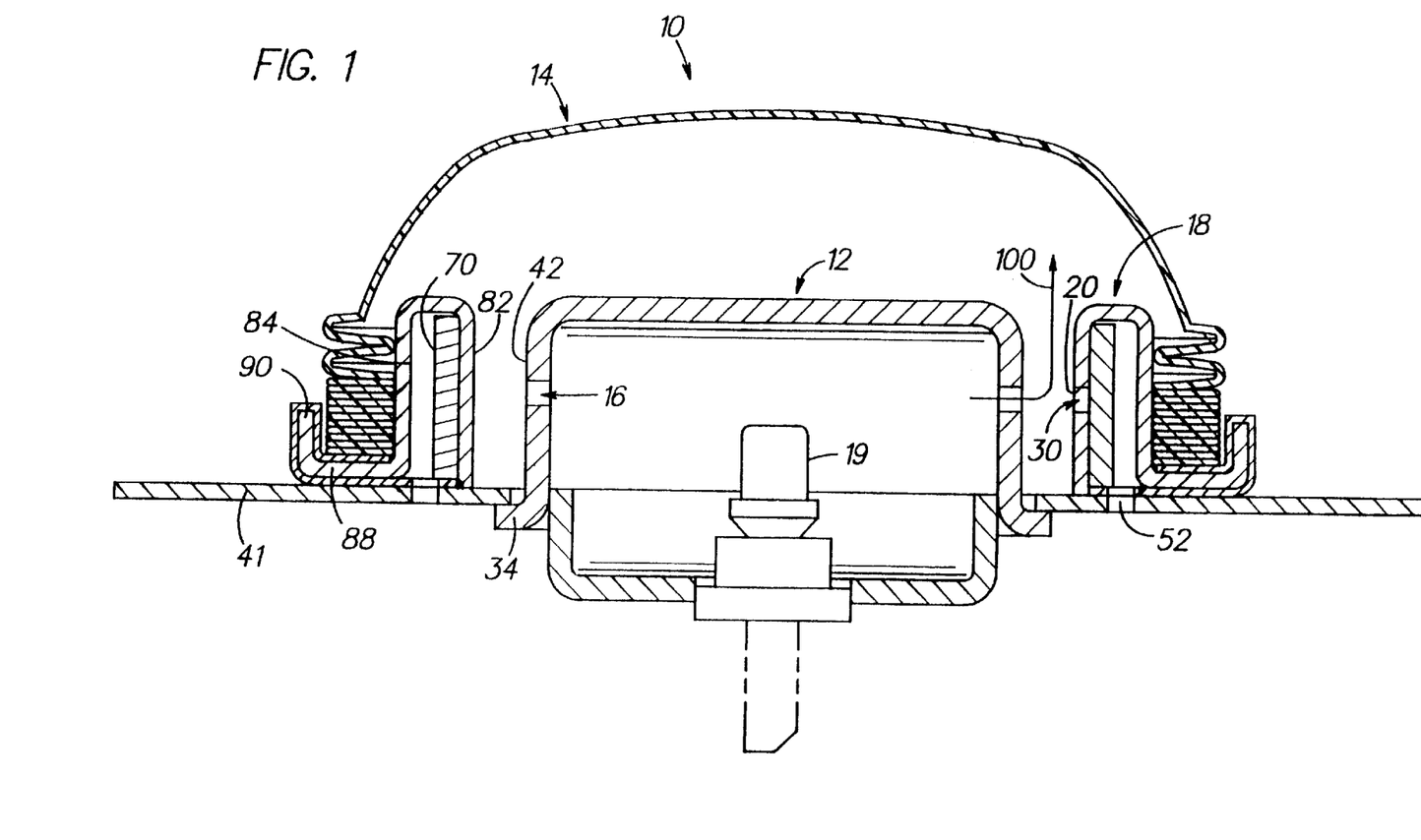
FIG. 1 is a cross-sectional side elevational view of an air bag module in a first position according to one embodiment the present invention.

Referring to the FIG. 1, an air bag module according to a first embodiment is generally designated at 10. The air bag module 10 is suitably mounted to a central hub of a steering wheel (not shown). The air bag module 10 includes an inflator 12 for generating inflator gas upon the sensing of predetermined vehicle conditions, i.e. rapid deceleration, to inflate an air bag cushion 14. Inflator 12 has a predetermined number of vent ports 16 radially disposed within inflator 12. A cushion retainer 18 is disposed about the inflator for directing gases from the inflator 12 to the air bag cushion 14. The cushion retainer 18 comprises an annular member and further includes a predetermined number of diffuser openings 20 which fluidly communicate with the air bag cushion 14 and permit inflator gas to pass into and inflate the air bag cushion 14 under deployment conditions. The inflator 12 shown is commonly used for an air bag module 10 installed in a driver side of a vehicle to protect the driver thereof. A second embodiment of an air bag module 200 according to the present invention for use with other passive restraints, i.e., passenger side air bag modules and side impact air bag modules will be described hereinafter with reference to FIGS. 5–6.

Upon actuation of the inflator 12 in response to a sudden deceleration of a motor vehicle, heated gas discharges from the inflator vent ports 16 disposed in the inflator 12 to inflate the air bag cushion 14. A controller (not shown), e.g., a sensing and actuating system, generates an ignition signal to the inflator 12 in response to velocity responsive sensors (not shown) mounted on the vehicle bumper and/or acceleration, or inertia responsive sensors mounted on a part of the vehicle occupant compartment, such as the fire wall. In response to the sensed signals, the controller provides an ignition signal to the inflator 12 to initiate deployment inflation of the air bag cushion 14 in accordance with a predetermined level of deceleration. In response to the ignition signal, the inflator 12 releases an appropriate predetermined volume of gas into the air bag cushion 14 through the vent ports 16 of the inflator 12. The level of deployment of the air bag cushion 14 is partially dependent upon on the actuation of a slide actuator assembly 30 slidably arranged to selectively restrict or prevent gas flow away from the air bag cushion 14, as will be described hereinafter.

Inflator 12 may be of any conventional construction for generating inflator gas to inflate the air bag cushion 14. Advantageously, the inflator 12 is preferably a single stage inflator which outputs inflator gas to inflate the air bag cushion 14. The inflator 12 has a generally cylindrical body portion and a flange 34 that suitably secures to a base plate 41. The vent ports 16 are preferably formed in a side wall 42 of inflator 12 and extend around side wall 42 of inflator 12 in a radial manner and it is understood that the number and dimension of the vent ports 16 may be varied according to the precise application and configuration of the inflator 12. An initiator or pyrotechnic device (not shown) disposed within the inflator 12 ignites pyrotechnic material which generates heated gas that discharges through the discharge vent ports 16 to inflate the air bag cushion 14.

As shown in FIG. 1, the base plate 41 supports both the inflator 12, a slide mechanism 30, and a cushion retainer 18. The inflator 12 is mounted within a central opening 46 of the base plate 41 by known techniques, including the use of a plurality of threaded studs (not shown) extending from a bottom surface thereof. The base plate 41 includes first slots 52 disposed about the central opening 46 which provides a gas venting path for directing inflator gas away from the air bag cushion 14. First slots 52 comprise a vent opening for venting the inflator gas away from the air bag cushion 14 under predetermined conditions.

Referring to FIGS. 1–4, the slide mechanism 30 comprising a slide ring member having an annular wall 70 which defines a central opening 72. The annular wall 70 has an upper edge 74 and an opposing lower edge 76. Extending upwardly from the upper edge 74 is a pair of connecting tabs 78. Preferably, the connecting tabs 78 are integral with the annular wall 70 and each connecting tab 78 includes an opening 81 formed therein. As illustrated and according to one exemplary embodiment, the connecting tabs 78 are spaced about the upper edge 74 so that one connecting tab 78 generally opposes the other connecting tab 78. In other words, connecting tabs 78 are orientated about 180° from each other. Slide ring 30 further includes a plurality of vent ports 80 formed in annular wall 70. As shown, the exemplary vent ports 80 are generally rectangular shaped openings formed in the annular wall 70. The vent ports 80 are off set from the connecting tabs 78. In the preferred embodiment, the vent ports 80 are formed in the annular wall 70 so that the vent ports 80 oppose one another. Thus, the vent ports 80 are also preferably orientated about 180° from each other.

The cushion retainer 18 includes an annular inner wall 82 and an annular outer wall 84. Annular inner wall 82 includes diffuser openings 20 for venting the inflator gas away from the inflator 12 as will be described in greater detail hereinafter. Annular outer wall 84 includes an outer flange 88 which extends therefrom, wherein the outer flange 88 includes an upwardly extending lip 90 about its outer periphery. Cushion retainer 18 includes a generally horizontal wall 92 extending between the annular inner wall 82 and the annular outer wall 84. When assembled, the horizontal wall 92 of the cushion retainer 18 extends above the vent ports 16 of the inflator 12. The air bag cushion 14 is disposed between the outer flange 88 and the annular outer wall 84.

Figure 3:
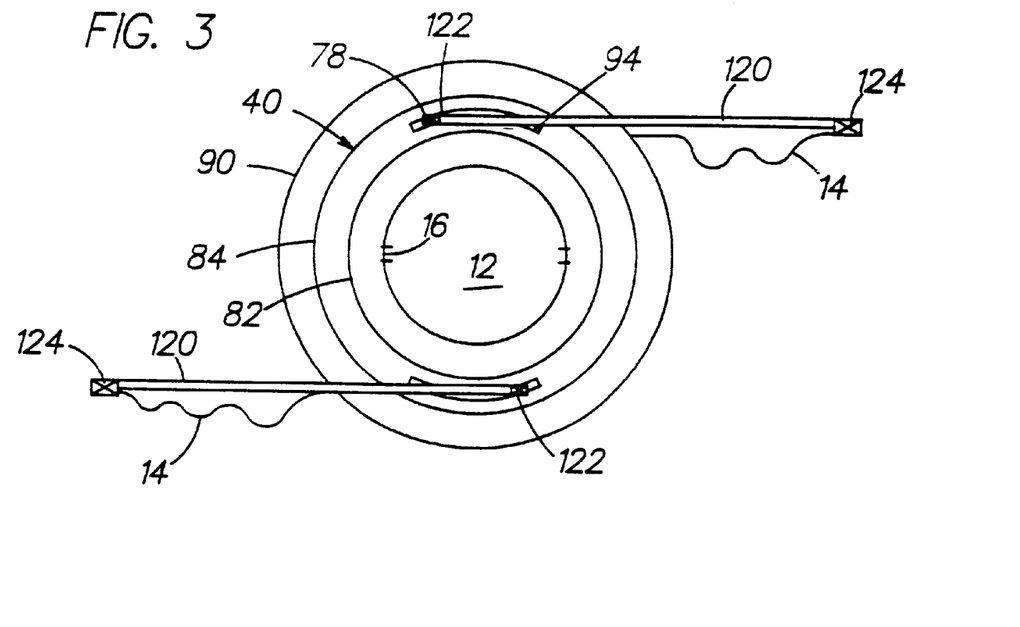
FIG. 3 is a perspective view of a slide ring for use in the air bag module of FIG. 1.
Figure 4:
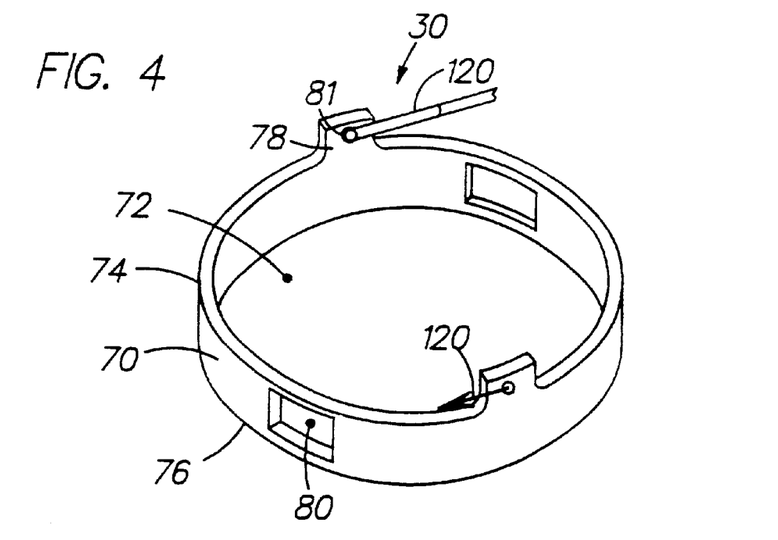
FIG. 4 is a partial top plan view of the air bag module of FIG. 1.

Formed in the cushion retainer 18, more specifically in the horizontal section 92, are slots 94 at which receive the connecting tabs 78. As best shown in FIG. 3, the slots 94 comprise arcuate slots which permit movement of the connecting tabs 78 therein between end walls of the slots 94. Accordingly, the degree of movement of the connecting tabs 78 within the slots 94 depends on the length of the slots 94.

The slide ring 30 is disposed between the annular inner wall 82 and the annular outer wall 84 and the connecting tabs 78 are disposed within the slots 94. As shown in FIG. 1, in a first closed position, the vent ports 80 of the slide ring 30 are not axially aligned with the diffuser openings 20 formed in the annular inner wall 82 of the cushion retainer 18 so that the inflator gas flows according to a first fluid flow path generally indicated at 100. The first fluid flow path 100 comprises a fluid flow path in which the inflator gas flows from the inflator 12 through the vent ports 16 and into the air bag cushion 14 for inflation thereof. In this first closed position, the inflator gas is prevented from flowing away from the air bag cushion 14 through the first slots 52 because the vent ports 80 and the diffuser openings 20 are not aligned relative to each other. The inflator gas thus is directed by the cushion retainer 18, more specifically the annular inner wall 82, upward into the air bag cushion 14. The default or normal position of the air bag module 10 is the first closed position shown in FIG. 1.

Figure 2:
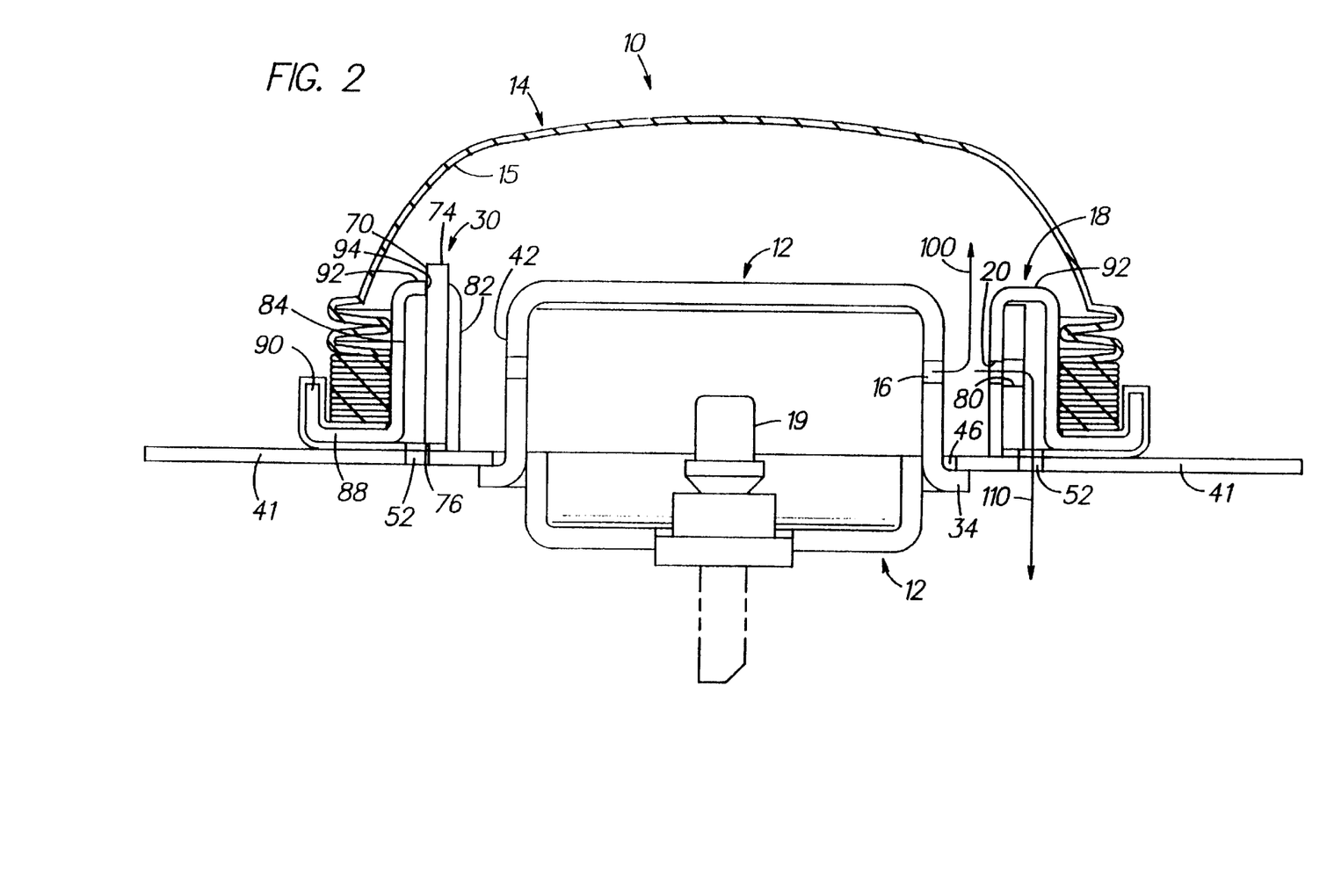
FIG. 2 is a cross-sectional side elevational view of the air bag module of FIG. 1 in a second position.

Referring to FIG. 2, in the second open position, the vent ports 80 of the slide ring 30 are axially aligned with the diffuser openings 20 formed in the annular inner wall 82 of the cushion retainer 18 so that the inflator gas flows according to a second fluid flow path generally indicated at 110 and according to the first fluid flow path generally indicated at 100. In the second fluid flow path 110, some of inflator gas generated in the inflator 12 exits therefrom by flowing through the vent ports 16 through the aligned vent ports 80 and the diffuser openings 20 before flowing through the first slots 52 formed in the base plate 41. Accordingly, the volume of inflator gas which flows according to the second fluid flow path 110 exits the air bag module 10 and is directed away from the air bag cushion 14.

Now referring to FIGS. 1–4. According to the exemplary illustrated embodiment, the slide ring 30 is connected to a pair tethers 120 which themselves are connected to a portion of the air bag cushion 14. Each tether 120 has a first end 122 which is secured to one of connecting tabs 78. Preferably, the first end 122 is secured to the connecting tab 78 by disposing the first end 122 through the opening 81 formed in the connecting tab 78. An opposing second end 124 of the tether 120 is secured to a portion of the air bag cushion 14. In the pre-deployment state, the air bag cushion 14 is folded to fit between the outer flange 88 and the annular outer wall 84 of the cushion retainer 18. Therefore a portion of the air bag cushion 14 about the connecting tab 78 and generally about the annular wall 70 is in a folded state with the air bag cushion material being slack. The air bag cushion 14 includes a rear surface 15 which generally faces the annular outer wall 84 and the inflator 12 when the air bag cushion 14 is disposed thereabout. Preferably, the second end 124 of the tether 120 is secured to the rear surface 15 of the air bag cushion 14.

The operation of the air bag module 10 of the present invention will now be discussed in greater detail. As previously mentioned, the default position of the air bag module 10 is illustrated in FIG. 1. Under predetermined deployment conditions and upon actuation of the air bag module 10, the controller actuates the inflator 12 to cause generation of heated inflator gas. Typically, the inflator 12 has a pyrotechnic initiator 19 which upon actuation ignites pyrotechnic material of the inflator 12 to generate the heated inflator gas. The heated inflator gas is discharged through the vent ports 16 of the inflator 12 and flows according to the first fluid flow path 100 into the air bag cushion 14. As the air bag cushion 14 begins to inflate, the air bag cushion 14 begins to unfold and is directed away from the cushion retainer 18. The inflation of the air bag cushion 14 causes the rear surface 15 of the air bag cushion 14 to become stressed (skin stress). As the rear surface 15 is stressed, the tether 120 is pulled tighter because the second end 124 thereof is attached to the rear surface 15, which is under stress. It will be appreciated that the present invention permits the pressure of the air bag cushion 14 to be sensed and when the pressure reaches a predetermined level, the tether 120 is tightened.

The tightening of the tether 120 results in the slide ring 30 being rotationally twisted relative to the cushion retainer 40. More specifically, because first ends 122 are attached to the connecting tabs 78, the tightening of the slide ring 30 causes the slide ring 30 to be rotationally disposed about the cushion retainer 18 and the vent ports 80 of the slide ring 30 are axially aligned with the diffuser openings 20 of the cushion retainer 40. The alignment of the vent ports 80 and the diffuser openings 20 effectively opens the second fluid flow path 110 and permits some of the heated inflator gas to flow away from the air bag cushion 14 through the first slot 52 formed in the base plate 41. The predetermined level may be selected by varying parameters relating to the use of tether 120 as an actuator for causing the rotation of slide ring 30. For example, the length of the tether 120 may be varied so that the tether 120 tightens at various air bag cushion pressures. By opening the second fluid flow path 110, some of the heated inflator gas is vented away from the air bag cushion 14 resulting in reduced deployment of the air bag cushion 14. Thus, the air bag module 10 provides variable output inflation of the air bag cushion 14 from a single inflator 12. This second open position is illustrated in FIG. 2.

The use of the slide ring 30 of the present invention permits the proper variable inflation of the air bag cushion 14 when the occupant is in either a forward position in a seat (not shown), a more rearward position in the seat, or positions therebetween. When the occupant is position closer to the SIR system (air bag module 10), the inflating air bag cushion 14 contacts the occupant earlier in the inflation process than if the occupant than if the occupant was seated more rearwardly in the seat. As the air bag cushion 14 contacts the occupant and continues to inflate, the rear surface 15 of the air bag cushion 14 will become stressed earlier in time than if the occupant was seated more rearwardly. Accordingly, the tether 120 is tightened earlier resulting in the rotation of the slide ring 30 to thereby open the second fluid flow path 110. This results in some of the inflator gas being directed away from the air bag cushion 14 and therefore a lower level of deployment is achieved. In other words, when the occupant is positioned closer to the SIR system (air bag module 10), the actuation of the slide ring 30 occurs sooner in time than if the occupant is seated more rearwardly. When the occupant is seated more rearwardly, the air bag cushion 14 inflates to a greater volume before contacting the occupant. Thus, a higher level of deployment is achieved before the air bag cushion 14 becomes stressed and the slide ring 30 is actuated to direct some of the inflator gas away from the air bag cushion 14. Advantageously, the slide ring 30 provides variable inflation and is designed to actuate depending upon the positioning of the occupant so as to inflate the air bag cushion 14 to a desired, predetermined level.

Figure 5:
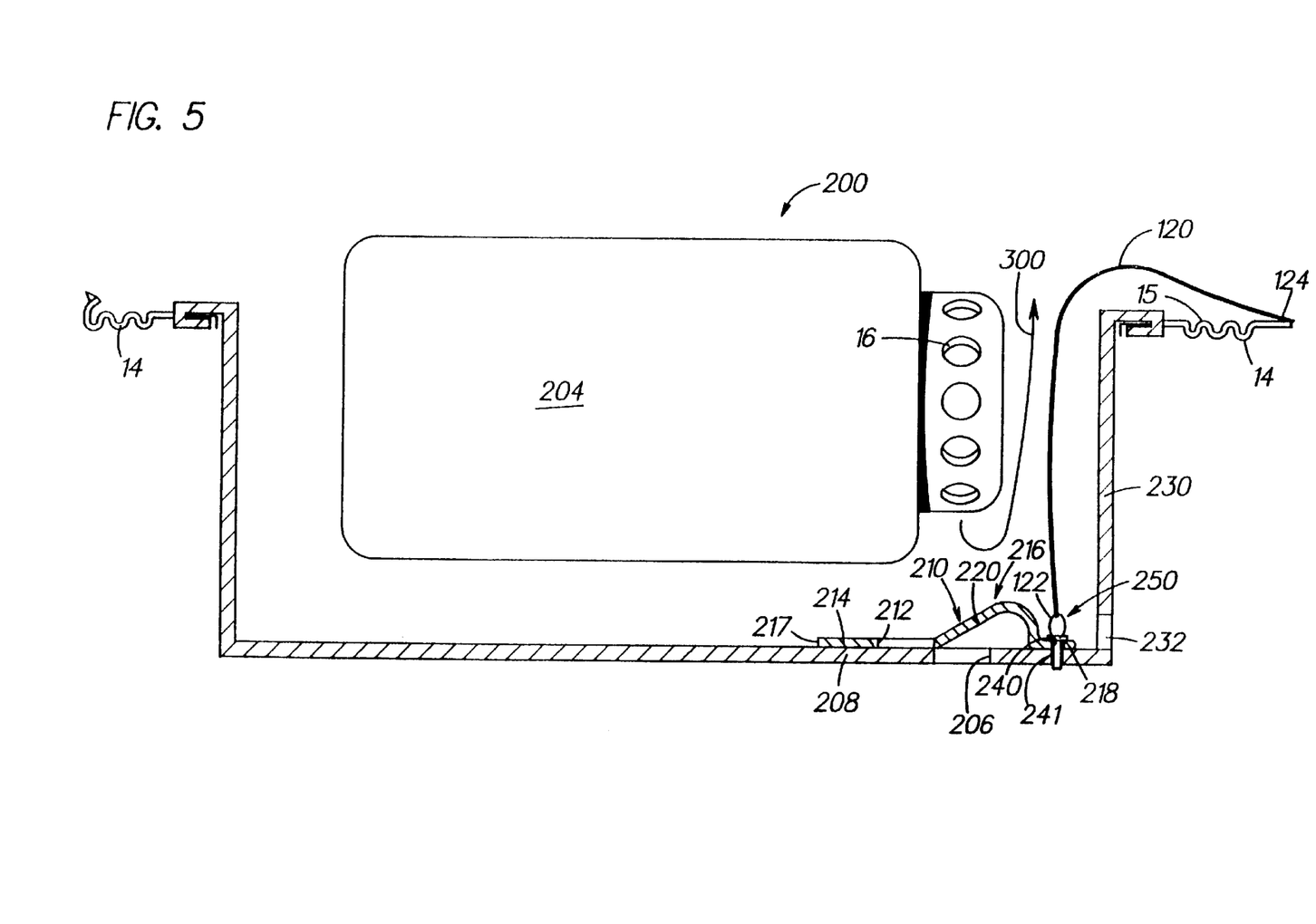
FIG. 5 is a cross-sectional side elevational view of an air bag module in a first position according to another embodiment of the present invention.
Figure 6:
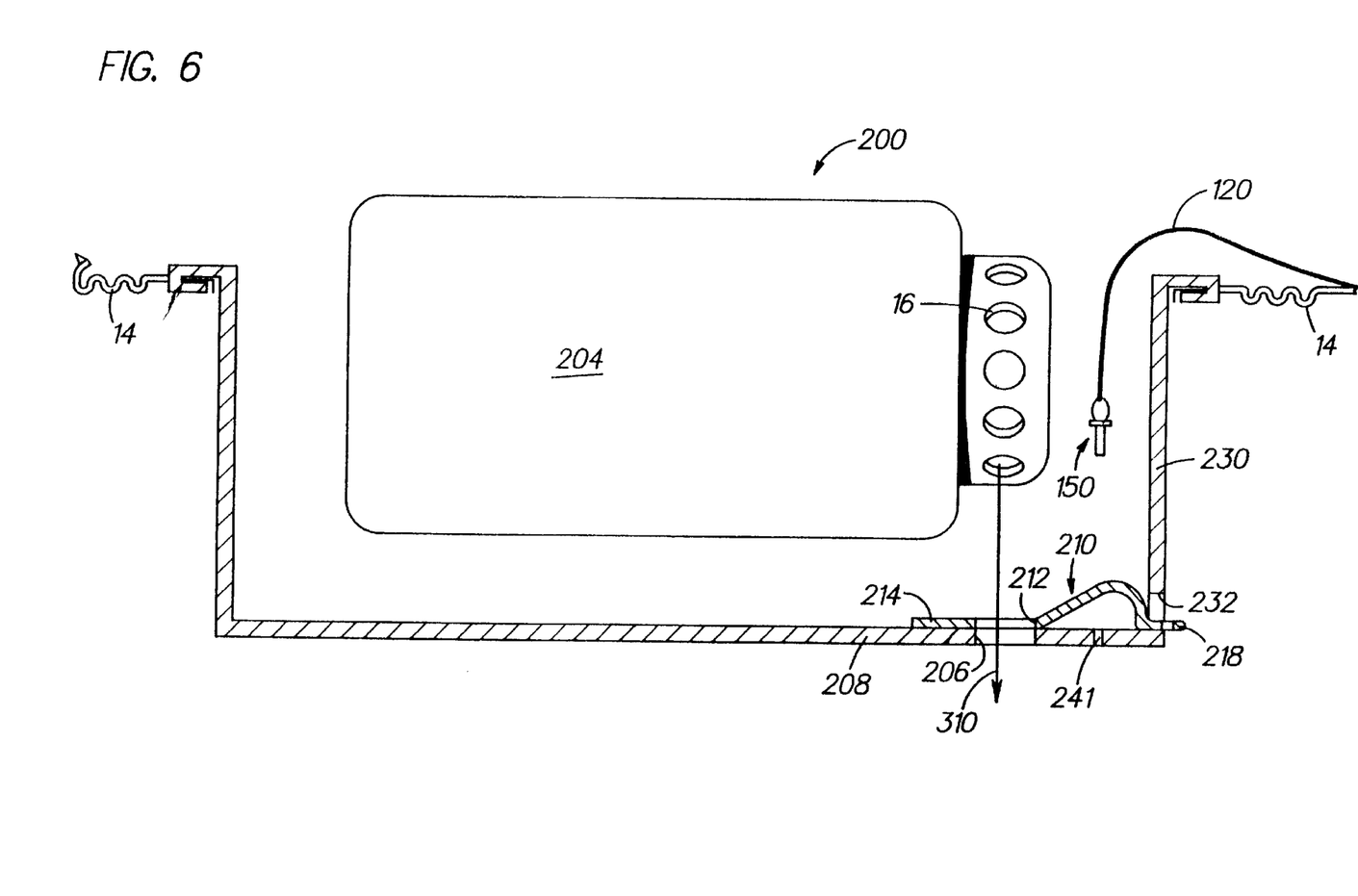
FIG. 6 is a cross-sectional side elevational view of the air bag module of FIG. 5 in a second position.

FIGS. 5–6 illustrate an air bag module according to a second embodiment of the present invention and is generally indicated at 200. FIG. 5 illustrates the air bag module 200 in a closed position and FIG. 6 illustrates the air bag module 200 in an open position. Air bag module 200 is preferably intended for use in a passenger or side impact passive restraint systems. Air bag module 200 is similar to air bag module 100 with like elements being numbered alike. Air bag module 200 includes a module housing 202 having inflator 204 disposed therein. Inflator 204 includes a plurality of vent ports 16 formed therein. The air bag module housing 202 includes an opening 206 formed in a lower wall 208 thereof. The opening 206 acts as a vent port for directing heated inflator gas away from the air bag cushion 14. The module housing 202 further includes a slide mechanism 210 which is preferably coupled to the lower wall 208 of the air bag module housing 202. The slide mechanism 210 has an opening 212 formed therein. The exemplary illustrated slide mechanism 210 has a planar first surface 214 and a beveled section 216 formed between planar ends 217, 218 of the slide mechanism 210. More specifically, the beveled section 216 is formed of a beveled segment 220 formed adjacent the opening 212 and a vertical section 222 connecting one end of the beveled segment 220 to planar end 218. The vertical section 222 is substantially perpendicular to the planar end 218. Formed between the vertical section 222 and the planar end 218 is a first retaining opening 240.

Module housing 202 includes an end wall 230. The end wall 230 includes a slot 232 formed therein so that planar end 218 of the slide mechanism 210 may be received therein during actuation of slide mechanism 210. The module housing 202 also has a second retaining opening 241 formed therein. Second retaining opening 241 is formed between opening 206 and the end wall 230. Preferably, first and second retaining openings 240, 241 have a complementary shape and complementary dimensions.

In the first closed position illustrated in FIG. 5, the slide mechanism 210 covers the opening 206 to prevent the heated inflator gas from flowing therethrough and away from the air bag cushion 14. In this closed position, the opening 206 are covered by the beveled segment 220 of the slide mechanism 210. The slide mechanism 210 is retained in the closed position by retaining member 250 which is received within the first retaining opening 240 and extends through to the second retaining opening 241.

Retaining member 250 comprises any number of members and in one embodiment, the retaining member 250 comprises a pin. The end of the retaining member 250 which is not received within the first and second retaining openings 240, 241 is attached to first end 122 of the tether 120. The second end 124 of the tether 120 is attached to a portion of the air bag cushion 14. Similar to the first embodiment, the air bag cushion 14 in the pre-deployment condition is generally folded and the material forming the air bag cushion 14 is slack about the module housing 202 which secures one end of the air bag cushion 14 to the air bag module 200.

The operation of air bag module 200 will now be described with reference to FIGS. 5–6. The default or initial position of air bag module 200 is preferably the first closed position of FIG. 5. Under predetermined deployment conditions and upon actuation of the air bag module 200, the controller actuates the inflator 202 to cause generation of heated inflator gas. Typically, the inflator 202 has a pyrotechnic initiator 19 which upon actuation ignites pyrotechnic material of the inflator 202 to generate the heated inflator gas. The heated inflator gas is discharged through the vent ports 16 of the inflator 202 and flows according to a first fluid flow path 300 into the air bag cushion 14. As the air bag cushion 14 begins to inflate, the air bag cushion 14 begins to unfold and is directed away from the module housing 204. The inflation of the air bag cushion 14 causes the rear surface 15 of the air bag cushion 14 to become stressed (skin stress). As the rear surface 15 is stressed, each tether 120 is pulled tighter because the second end 124 thereof is attached to the rear surface 15, which is under stress.

The tightening of each tether 120 results in the displacement of the retaining member 250 from the first and second retaining openings 240, 241. Once the respective retaining member 250 is displaced, the slide mechanism 210 is free to move in a direction toward the end wall 230 of the module housing 202. Because the inflator gas contact the beveled section 216, the natural flow the inflator gas causes the free slide mechanism 210 to be driven towards the end wall 230. The beveled nature of section 216 and the flow of the inflator gas thereon, which acts as an unbalanced force, powers open the slide mechanism 210 and drives the second planar end 218 of the slide mechanism 210 into the slot 232 formed in the end wall 230. This action causes the openings 206 and 212 to be generally axially aligned to provide fluid communication therebetween. This alignment permits the heated inflator gas to flow according to a second fluid flow path 310 in which some of the heated inflator gas exits the module housing 204 through openings 206 and 212. Thus, as in the first embodiment, the air bag module 200 provides variable output inflation by permitting the pressure of the air bag cushion 14 to be sensed and when a predetermined pressure level is observed, additional heated inflator gas is vented from the air bag module 200 through openings 206 and 212. This results in reduced, variable output inflation. The predetermined level at which the slide mechanism 210 is actuated may be selected by varying parameters relating to the use of tether 120. For example, the length of the tether 120 may be varied so that the tether 120 tightens at various air bag cushion pressures.

The present invention offers a more versatile air bag module by permitting control over the moles of gas sent into the air bag cushion by providing a direct mechanical system for cushion pressure feedback to tailor the inflation in a manner that may be reliable, yet cost effective. More specifically, the use of tethers 120 in combination with the slide ring 30 permits the pressure of the air bag cushion to be sensed and when the cushion pressure reaches a predetermined level, some of the heated inflator gas is vented off and is directed out of the air bag module 10 away from the air bag cushion 14. This permits the air bag module 10 to be tailored for specific air bag applications.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag module for restraint of an occupant in vehicle, the air bag module comprising:

an air bag cushion having a rear surface;

an inflator being activatable to discharge inflator gas for inflating the air bag cushion, the inflator having at least one discharge vent port through which the inflator gas is discharged;

a module housing having at least one first vent opening formed therein, the inflator being disposed within the module housing and the air bag cushion being retained to the module housing, the module housing having a slot formed therein;

a slide mechanism having a slide member disposed within the module housing proximate the at least one first vent opening, the slide mechanism having a slide vent opening;

at least one tether having a first end and an opposing second end; and a retaining member being attached to the first end of the at least one tether, the retaining member for releasably retaining the slide member in a closed position where the slide vent opening and the at least one first vent opening are not in fluid communication, the second end being attached to the rear surface of the air bag cushion, wherein during inflation of the air bag cushion, the inflator gas flows according to a first fluid flow path into the air bag cushion until the air bag cushion reaches a predetermined pressure at which time the at least one tether is tightened causing the retaining member to be disengaged from the slide mechanism permitting movement of the slide member so that the at least one first vent opening and the slide vent opening fluidly communicate with each other permitting the inflator gas to be expelled out of the air bag module housing away from the air bag cushion.

2. The air bag module as set forth in claim 1, wherein the retaining member is a pin.

3. The air bag module as set forth in claim 1, wherein the second end of the at least one tether is initially attached to a slack portion of the air bag cushion prior to the air bag cushion obtaining the predetermined pressure.

4. The air bag module as set forth in claim 1, wherein the slide member includes a beveled surface proximate the at least one discharge vent port so that once the retaining member is disengaged the flow of the inflator gas on the beveled surface drives the slide member to align the at least one first vent opening and the slide vent openings.

5. A variable pressure air bag module for restraint of an occupant in a vehicle, comprising:

an inflatable air bag cushion having an inner skin;

a housing member connected to said inflatable air bag cushion defining a sealed space proximate said inner skin;

at least one variable pressure opening defined in said housing member, said at least one variable pressure opening being in fluid communication with said sealed space;

an inflator having at least one discharge port in fluid communication with said sealed space and being activatable to discharge an inflation gas into said sealed space to inflate said inflatable air bag cushion;

a slide mechanism for movement between a first position covering said variable pressure opening and a second position opening said variable pressure opening, said variable pressure opening directing said inflation gas toward said sealed space in said first position it inflate said airbag at a first pressure and directing at least some of said inflation gas away from said sealed space to inflate said airbag at a second pressure, said second pressure being lower than said first pressure; and a tether connected to said slide mechanism and said inner skin, said tether being sensitive to pressure on said inflatable air bag to move said slide mechanism from said first position to said second position.

6. The variable pressure air bag module of claim 5, wherein said slide mechanism comprises a slide ring member having at least one vent port, said slide ring member being rotable between said first position having said vent port distal said variable pressure opening and said second position having said vent port proximate said variable pressure opening.

7. The variable pressure air bag module of claim 6, further comprising:

a connecting tab extending from said slide ring member, said tether being connected to said connecting tab and to said inner skin, said tether being sensitive to pressure on said inflatable air bag to rotate said slide ring member from said first position to said second position.

8. The variable pressure air bag module of claim 5, wherein said slide mechanism comprises a beveled member having at least one vent port, said beveled member being slidable between said first position having said vent port distal said variable pressure opening and said second position having said vent port proximate said variable pressure opening.

9. The variable pressure air bag module of claim 8, wherein said beveled member is maintained in said first position by a retaining member, said retaining member being removable by said tether in response to pressure on said inflatable air bag to slide said beveled member from said first position to said second position.

10. An air bag module, comprising:

an air bag cushion having a rear surface;

means for inflating the air bag cushion;

a housing having a housing vent opening formed therein, the housing having the means for inflating disposed therein and having the air bag cushion retained thereto, a slide member disposed within the housing proximate the housing vent opening, the slide mechanism having a slide vent opening; and means for moving the slide member between an opening and a closed position, the closed position having the slide vent opening and the housing vent opening are not in fluid communication, and the open position having the slide vent opening and the housing vent opening in fluid communication, said means for moving attaching the slide member to the rear surface of the air bag cushion, the means for moving releasably retaining the slide member in the closed position during inflation of the air bag cushion such that said means for inflating flows through a first fluid flow path into the air bag cushion until the air bag cushion reaches a predetermined pressure at which time the means for moving releases the slide member and moves the slide member to the open position such that the means for inflating flows out of the air bag housing and away from the air bag cushion.

11. The air bag module as set forth in claim 10, wherein the means for moving is a pin connected to a tether, the pin being attached to the slide member and the tether being attached to the rear surface of the air bag cushion.

12. The air bag module as set forth in claim 10, wherein the slide member includes a beveled surface proximate the means for inflating such that flow from said means for inflating acts on the beveled surface to drive the slide member from the closed position to the open position once the means for moving releases the slide member.

13. The air bag module as set forth in claim 12, wherein the means for inflating the air bag cushion comprises:

an inflator being activatable to discharge inflator gas for inflating the air bag cushion, the inflator having at least one discharge vent port through which the inflator gas is discharged, the discharge port being proximate the beveled surface such that the flow of the inflator gas on the beveled surface drives the slide member from the closed position to the open position.

* * * * *